(12) United States Patent
Kweon (10) Patent No.: US 9,751,996 B2
(45) Date of Patent: Sep. 5, 2017

(54) POLYAMIDE RESIN COMPOSITION WITH HIGH HEAT RESISTANCE AND OXIDATION RESISTANCE

(71) Applicant: Hyundai Motor Company, Seoul (KR)

(72) Inventor: Kyoung Chun Kweon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/190,934

(22) Filed: Jun. 23, 2016

(65) Prior Publication Data
US 2017/0174851 A1 Jun. 22, 2017

(30) Foreign Application Priority Data
Dec. 21, 2015 (KR) .......................... 10-2015-0182924

(51) Int. Cl.
| | |
|---|---|
| C08K 5/098 | (2006.01) |
| C08J 5/10 | (2006.01) |
| C08J 5/04 | (2006.01) |
| C08L 77/06 | (2006.01) |

(52) U.S. Cl.
CPC ............ *C08J 5/10* (2013.01); *C08J 5/043* (2013.01); *C08L 77/06* (2013.01); *C08J 2377/06* (2013.01); *C08J 2477/06* (2013.01); *C08L 2201/08* (2013.01); *C08L 2205/025* (2013.01)

(58) Field of Classification Search
CPC . C09J 5/10; C09J 5/043; C09J 2377/06; C09J 2477/06
See application file for complete search history.

(56) References Cited

U.S. PATENT DOCUMENTS

| | | | |
|---|---|---|---|
| 4,602,058 A | 7/1986 | Graham et al. | |
| 2013/0197145 A1* | 8/2013 | Thompson | C08K 5/098 524/397 |
| 2013/0338260 A1 | 12/2013 | Center et al. | |

FOREIGN PATENT DOCUMENTS

| | | | | |
|---|---|---|---|---|
| JP | 2011-016912 A | 1/2011 | | |
| JP | 2014502222 A | 1/2014 | | |
| KR | 10-2015-0139443 A | 12/2015 | | |
| KR | 2015-0139443 A | * 12/2015 | ............... | C08J 5/04 |

* cited by examiner

*Primary Examiner* — Robert Harlan
(74) *Attorney, Agent, or Firm* — Mintz Levin Cohn Ferris Glovsky and Popeo, P.C.; Peter F. Corless (57) ABSTRACT

The present invention relates to a polyamide resin composition having substantially improved heat resistance and oxidation resistance. The polyamide resin composition comprises a polyamide copolymer having high heat resistance and high rigidity, glass fiber, citric acid and ethylenediaminetetraacetic acid (EDTA) which can rapidly cause surface oxidation with glass fiber, such that a highly dense oxide film can be formed on a polymer surface at high temperatures for a long time. Accordingly, the polyamide resin composition of the present invention can prevent oxidation and thermal decomposition by exterior oxygen and heat, and have substantially improved physical properties such as impact strength, tensile strength, flexural strength and elongation.

10 Claims, 7 Drawing Sheets

Beginning stage    After 1000 hours at 180°C

POLYAMIDE RESIN COMPOSITION WITH HIGH HEAT RESISTANCE AND OXIDATION RESISTANCE

CROSS-REFERENCE TO RELATED APPLICATION

This application claims under 35 U.S.C. §119(a) the benefit of priority to Korean Patent Application No. 10-2015-0182924 filed on Dec. 21, 2015, the entire contents of which are incorporated herein by reference.

BACKGROUND (a) Technical Field

The present invention relates to a polyamide resin composition having high heat resistance and oxidation resistance. The polyamide resin composition may include a polyamide copolymer having high heat resistance and high rigidity with citric acid and ethylenediaminetetraacetic acid (EDTA), which may rapidly cause surface oxidation with glass fiber, and form a highly dense oxide film on a polymer surface at high temperatures for a long time, thereby preventing oxidation and thermal decomposition by exterior oxygen and heat. In addition, the polyamide resin composition may have substantially improved excellent physical properties such as impact strength, tensile strength, flexural strength and elongation.

(b) Background Art

In recent plastic industry, materials have been required to have reduced weight, high resistance to elevated temperatures and high strength. In particular, for components for vehicles, the application of superior heat-resistant materials has been increased as the plastic materials have been exposed to highly elevated operating or surrounding temperatures thereof in reduced space. However, since plastic polymers are thermally decomposed upon continuous exposure to heat for an extended time, heat-resistance treatment to prevent oxidation and thermal decomposition thereof may be required for use under such conditions. For instance, nylon (PA66), as a representative aliphatic polyamide (PA), has been used in various industries to provide high mechanical strength, chemical resistance and heat resistance.

Among others, PA6T, which is a kind of semi-aromatic polyamide, has been used because it has greater heat resistance and less moisture absorption than nylon (PA66). However, PA6T has high melting point such that manufacturing using PA6T may not be efficient. For this reason, copolymers of PA6T with PA6I or nylon have been generally used for materials of vehicle components, such as fuses for engine rooms, connectors and mobile connectors, requiring high heat resistance and dimensional strength. However, when those components continuously exposed to a temperatures of 100° C. or greater, oxidation and thermal decomposition may occur, and essential properties such as strength and elongation as well as overall properties thereof may be significantly reduced, although each component of those polymers has a high melting point.

Accordingly, in the related arts, inorganic substances such as CuI or KI as heat-resistant treating agents and organic substances such as hindered amines or phenols as additives have been used. However, the effects of delaying oxidation and thermal decomposition have been obtained only upon temporary exposure to high temperatures without reducing oxidation and thermal decomposition. In addition, physical properties have been thus deteriorated upon exposure to high temperatures for extended time. In particular, when an amount of added heat-resistant treating agent is increased so as to improve long-term heat resistance, significant deterioration in basic physical properties may occur.

Accordingly, for extended use of engineered plastic polymers, which are lightweight and have superior shape molding and basic physical properties in the industries requiring high physical properties at high temperatures, as alternative to metals, development of technologies may be required to prevent oxidation and thermal aging of the polymers.

The above information disclosed in this section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems associated with prior art.

In preferred aspects, the present invention provides a polyamide resin composition that may form a highly dense oxide film on polymer surfaces when the polymer is exposed at a high temperature for a long time. The polyamide resin composition may include a polyamide copolymer having high heat resistance and high rigidity, glass fiber, citric acid and ethylenediaminetetraacetic acid (EDTA) which can rapidly cause surface oxidation with glass fiber. As such, oxidation and thermal decomposition by exterior oxygen and heat may be prevented, thereby providing substantially improved physical properties such as impact strength, tensile strength, flexural strength and elongation even at high temperatures for a long time, as compared to conventional materials.

The term "oxide film" as used herein refers to a deposition or a layer of the deposition formed of materials (e.g. polymer, metal and the like) oxidated by, for example, air, moisture or other surrounding substance. The "highly dense oxide film", as used herein, refers to an oxide film having a density of the film material of equal to or greater than 0.5 g/cm$^3$ Preferably, the highly dense oxide film of the present invention may contain a polyamide copolymer, a glass fiber, citric acid, and ethylenediaminetetraacetic acid (EDTA).

In one aspect, provided is a polyamide resin composition with high heat resistance and oxidation resistance. The polyamide resin composition with high heat resistance and oxidation resistance may comprise: an amount of about 56 to 69% by weight of a polyamide copolymer, an amount of about 30 to 40% by weight of a glass fiber, an amount of about 0.5 to 2% by weight of citric acid, and an amount of about 0.5 to 2% by weight of ethylenediaminetetraacetic acid (EDTA). All the % by weights are based on the total weight of the polyamide resin composition.

The polyamide copolymer may be a copolymer of aromatic or semi-aromatic polyamide and aliphatic polyamide monomers. The polyamide copolymer may be a copolymer of PA6T and PA66. The polyamide copolymer may comprise PA6T and PA66 mixed in a weight ratio of about 6:4 to about 5:5.

The "polyamide" refers to a macromolecule or polymerized molecule with repeating units linked by amide bonds (—CO—NH—), for example, proteins or synthetic polymers. Preferably, the polyamide refers to synthetic polymers having various main chains (chemical groups) attached to the amide linkages, without limitations to lengths, carbon numbers, chemical groups, or shape of thus formed polymer.

The term "aromatic polyamide", as used herein and generally known in the related arts as "aramid", refers to a synthetic polymer that is formed of amide linkages (—CO—NH—) and aromatic rings directly attached to at least one amide linkage. The aromatic polyamide may not be particularly limited in lengths, carbon numbers, variants of aromatic rings, or shape of thus formed polymer. In addition, the term "semi-aromatic polyamide", as used herein, refers to a synthetic polymer that is formed of amide linkages (—CO—NH—) and aromatic rings partially attached to the amide linkages. Preferably, the aromatic or semi-aromatic polyamide in the present invention may be formed of two monomers each containing six carbon atoms, e.g. hexamethylenediamine and terephthalate, or may be PA6T.

The term "aliphatic polyamide", refers to a synthetic polymer that is formed of amide linkages (—CO—NH—) and aliphatic carbon chains directly attached to the amide linkages. The aliphatic polyamide may not be particularly limited in lengths, carbon numbers of the main chain, isomers, or shape of thus formed polymer. Preferably, the aliphatic polyamide in the present invention may contain two monomers each containing six carbon atoms, e.g. hexamethylenediamine and adipic acid, or may be PA66.

The polyamide copolymer may be a compound represented by the following Formula 1:

Formula 1

In the Formula 1, n and m, each may be the same or different positive integer. Suitable values of each n and m may range from 1 to 1000, more typically 1, 2, 3, 4, 5, 6, 7, 8, 9, or 10, to 50, 100, 200, 300, 400, 500, 600, 700, 800, 900 or 1,000.

The glass fiber may have a diameter of about 10 to 13 μm and a length of about 250 to 500 μm. The polyamide resin composition may form an oxide film at a temperature of about 150 to 220° C. after 1,000 to 1,200 hours. The oxide film may have a thickness of about 45 to 55μm.

In addition, the present invention provides the polyamide resin composition that may consist essentially of, essentially consist of, or consist of the components described herein. For instance, the polyamide resin composition may consist essentially of an amount of about 56 to 69% by weight of the polyamide copolymer; an amount of about 30 to 40% by weight of the glass fiber; an amount of about 0.5 to 2% by weight of citric acid; and an amount of about 0.5 to 2% by weight of ethylenediaminetetraacetic acid (EDTA), all the % by weights are based on the total weight of the polyamide resin composition. Further, the polyamide resin composition may consist of an amount of about 56 to 69% by weight of the polyamide copolymer; an amount of about 30 to 40% by weight of the glass fiber; an amount of about 0.5 to 2% by weight of citric acid; and an amount of about 0.5 to 2% by weight of ethylenediaminetetraacetic acid (EDTA), all the % by weights are based on the total weight of the polyamide resin composition.

In another aspect, the present invention provides an article produced using the polyamide resin composition. The article produced using the polyamide resin composition may have superior physical properties and oxidation resistance even at high temperatures for a long time.

Further provided is a vehicle part that comprises the polyamide resin. For example, the vehicle part may be a battery fuse terminal of a vehicle.

Other aspects of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a polyamide resin composition that has substantially improved heat resistance at high temperature and oxidation resistance. The polyamide resin composition may comprise: an amount of about 56 to 69% by weight of a polyamide copolymer, an amount of about 30 to 40% by weight of a glass fiber, an amount of about 0.5 to 2% by weight of citric acid, and an amount of about 0.5 to 2% by weight of ethylenediaminetetraacetic acid (EDTA). Unless otherwise indicated, all the % by weights of the components are based on the total weight of the polyamide resin composition.

Preferably, the polyamide resin composition may be prepared by mixing an aromatic or semi-aromatic polyamide containing six carbon atoms and two aliphatic polyamide monomers containing six carbon atoms with acidic additives. For instance, the aromatic or semi-aromatic polyamide may be PA6T having high heat resistance and high rigidity which can be used at high temperatures of 100° C. or abov. In addition, the aliphatic polyamide monomers may be PA66. The acidic additives may include citric acid and ethylenediaminetetraacetic acid (EDTA) that may rapidly cause surface oxidation with the glass fiber. The polyamide resin composition may form an oxide film with a density of about 0.5 g/cm$^3$ on the polymer surface under high temperature environments (e.g. at a temperature of about 150 to 220° C.), thereby preventing oxidation and thermal decomposition by exterior oxygen and heat, and maintaining physical properties of polymers. In addition, the resin composition may be applied to various systems which needs to be used at high temperatures such as 150 to 220° C. for a long time (e.g. about 1,000 hours or longer).

When the above described components of the polyamide resin are exposed to high temperatures for a long time, rapid oxidation may occur on the surface thereof to form a surface oxide film, which advantageously inhibits additional internal oxidation thereof. As consequence, deterioration in physical properties or variation in appearance quality may be prevented. That is similar to passivation principle of metals to prevent additional corrosion of core metals by intended corrosion on the surface of the metal objects, which can be applied to polymer (plastic) materials to prevent corrosion of the polymer materials.

The polyamide copolymer may be a copolymer of PA6T as aromatic polyamide and PA66 as aliphatic polyamide.

Preferably, the polyamide copolymer may be obtained by mixing PA6T and PA66 in a weight ratio of about 6:4 to 5:5. For example, the mixing ration of the PA6T content to the content of PA66 is greater than the predetermined mixing ratio, for example, greater than about 6:4, physical properties of the resin may be improved. However, injection property may be reduced such that mass-production may be difficult. When the mixing ration of the PA66 content to the content of PA6T is greater than the predetermined mixing ratio, for example, 5:5, physical properties, water absorption and heat resistance may be reduced.

Preferably, the polyamide copolymer may be a compound represented by the following Formula 1:

Formula I

In Formula 1, n and m each may be the same or different positive integer.

The reactive group between peptide bonds of PA66 in the polyamide copolymer of Formula 1 may react with added citric acid and EDTA, resulting in oxidation reaction involving O—H groups. In this reaction, the oxidation reaction may rapidly proceed on the surface of plastic polymer exposed to a high temperature of heat to form a surface oxide film. The formed surface oxide film may prevent permeation of oxygen and thus prevents internal oxidation of the plastic polymer.

The glass fiber, as used herein, may reinforce physical properties of resin. Preferably, the glass fiber may have a diameter of about 10 to 13 μm and a length of about 250 to 500 μm. When the diameter of the glass fiber is less than about 10 μm, although basic physical properties of the resin may be improved, processing cost may be increased. When the diameter of the glass fiber is greater than about 13 μm, basic physical properties of the resin may be reduced. In addition, when the length of the resin is less than about 250 μm, basic physical properties of the resin may be reduced, and when the length thereof is greater than about 500 μm, warpage or dimensional strength of the injected-molded article may be degraded.

The polyamide resin composition may be formed into the oxide film at a temperature of about 150 to 220° C. after 1,000 to 1,200 hours. In particular, oxidation may rapidly occur from the surface when the composition is allowed to stand at the above described high temperature for the above described time, thereby forming a clear oxide film. This oxide film may prevent internal oxidation of the polymer.

The oxide film may have a thickness of about 45 to 55 μm. In particular, the thickness of the oxide film may be determined depending on surrounding temperature. For example, the oxide film having a high density of about 0.5 g/cm$^3$ or greater at a specific thickness may be used for the effect of preventing oxidation. To secure stability of physical properties of the resin, the formed oxide film may have a thickness of less than about 100 μm, or particularly, of about 45 to 55 μm.

The present invention also provides an article that comprises the polyamide resin composition as described herein. For example, the article may be produced using the polyamide resin composition.

Alternatively provided is a vehicle part that comprises the polyamide resin composition as described herein.

Accordingly, the polyamide resin composition according to various exemplary embodiments of the present invention may be prepared by mixing the polyamide copolymer having high heat resistance and high rigidity with citric acid and ethylenediaminetetraacetic acid (EDTA) which can rapidly cause surface oxidation with the glass fiber. Accordingly, a highly dense oxide film may be formed on the polymer surface at the high temperature for a long time, thereby preventing oxidation and thermal decomposition of the resins (e.g. interior of the resins) by exterior oxygen and heat.

As consequence, as compared to conventional materials in the related arts, the resin composition may have superior physical properties such as impact strength, tensile strength, flexural strength and elongation at high temperatures for extended exposure time. Thus, the polyamide resin of the present invention can be used as heat-resistant materials with excellent physical properties, thereby reducing production cost by 20% or more.

EXAMPLE

The following examples illustrate the invention and are not intended to limit the same.

Example

A resin composition was prepared by a common method, except that PA6T and PA66 were mixed in a weight ratio of 6:4 to produce a polyamide copolymer. Then, 35% by weight of a glass fiber, 1% by weight of citric acid and 1% by weight of EDTA were added to 61% by weight of the polyamide copolymer to prepare a polyamide resin composition.

Comparative Example

A resin composition was prepared in the same manner as in Example except that 35% by weight of the glass fiber was added to 65% by weight of the polyamide copolymer.

Test Example 1

Comparison of Heat Resistance and Oxidation Resistance Between Polyamide Resin Compositions To confirm heat resistance and oxidation resistance of the polyamide resins prepared in Example and Comparative Example, each of the resin compositions was coated on a plastic substrate and allowed to stand in a chamber at a high temperature of 180° C. for 1,000 hours. Then, the cross-section of the polyamide resin composition-coated plastic substrate was analyzed using a scanning electron microscope (SEM) and an optical microscope (OM). The results are shown in FIGS. 1 to 5.

Figure 1:
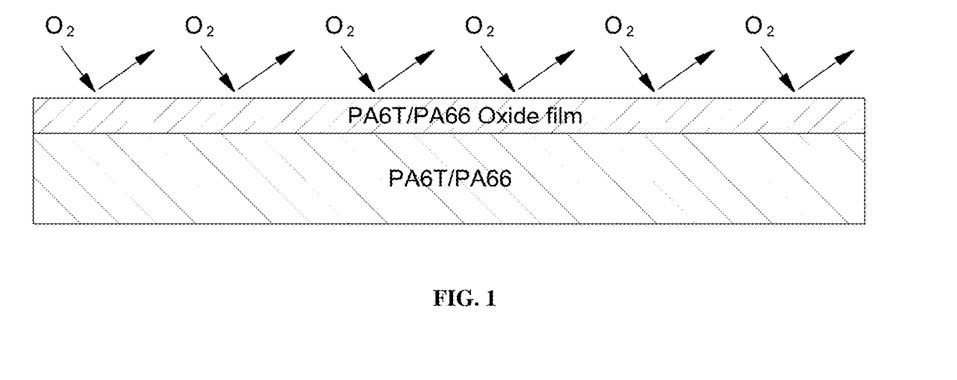
FIG. 1 illustrates a cross-section of an exemplary substrate coated with an exemplary polyamide resin composition as prepared in Example according to an exemplary embodiment of the present invention.

FIG. 1 illustrates a cross-section of a substrate coated with the polyamide resin composition prepared in Example. As shown in FIG. 1, the oxide film formed on the surface inhibited permeation of oxygen and thus prevented oxidation inside the polymer of the plastic substrate. In addition, the polyamide copolymer of PA6T and PA66 resulted in recrystallization of polymer chains at high temperatures of the glass transition temperature or greater, thereby improving basic physical properties such as strength, as can be seen from Test Example 2 below. In addition, the polyamide resin composition that could prevent oxidation using surface oxidation did not exhibit deterioration in physical properties at high temperatures of 180° C. or greater for 1,000 hours or longer (see Test Example 2).

Figure 2:
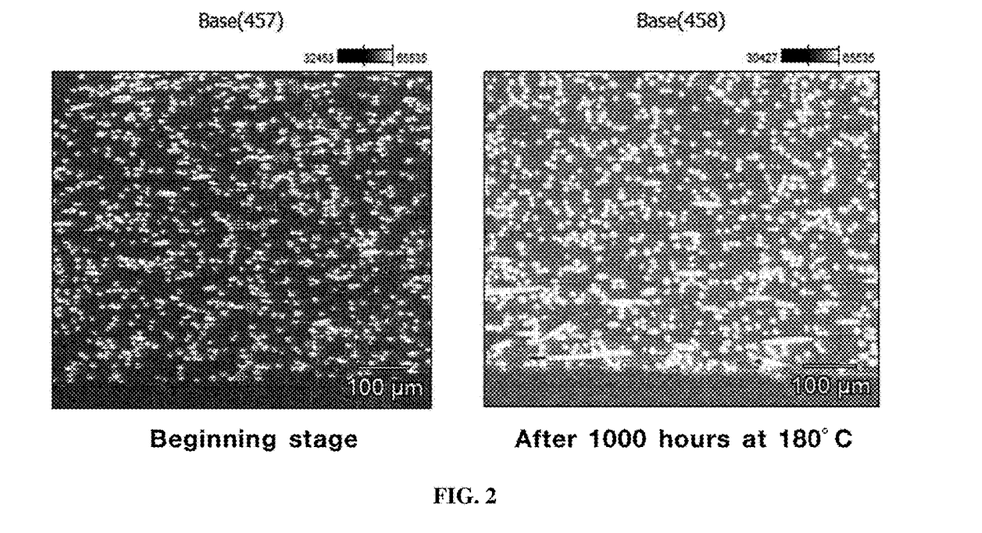
FIG. 2 is a scanning electron microscope (SEM) image showing cross-section analysis of an exemplary polymer of an exemplary substrate coated with an exemplary polyamide resin composition as prepared in Example according to an exemplary embodiment of the present invention.
Figure 6:
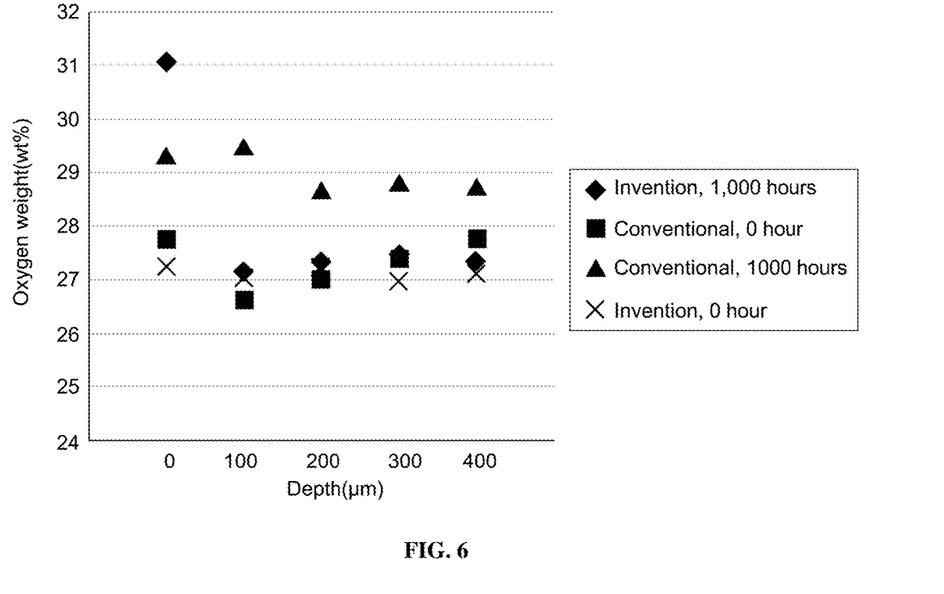
FIG. 6 is a graph showing oxygen content variation according to the depth from polymer surface before and after high-temperature heating, with respect to substrates coated with polyamide resin compositions as prepared in Example according to an exemplary embodiment of the present invention and in Comparative Example.

FIG. 2 is a scanning electron microscope (SEM) image showing cross-section analysis of the polymer of the substrate coated with the polyamide resin composition prepared in Example. Measurement points were plotted in a depth direction to measure oxygen content. As shown in FIG. 6 below, after the resin composition standing in the chamber at 180° C. for 1,000 hours, oxidation rapidly occurred only on the surface and did not proceed any more although the depth increased.

Figure 3:
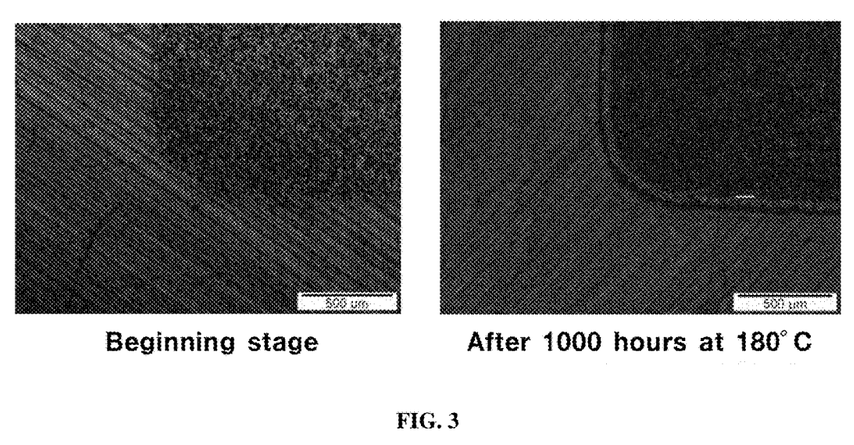
FIG. 3 is an optical microscope (OM) image showing cross-section analysis of an exemplary polymer of an exemplary substrate coated with an exemplary polyamide resin composition as prepared in Example according to an exemplary embodiment of the present invention.

FIG. 3 is an optical microscope (OM) image showing cross-section analysis of the polymer of the substrate coated with the polyamide resin composition prepared in Example. As shown in FIG. 3, after the resin composition standing in the chamber at 180° C. for 1,000 hours, severe oxidation occurred down to a depth of about 48 μm from the polymer surface, as compared to the beginning stage. Formation of the oxide film from the surface to the thickness of 48 μm could be seen from the clear boundary between the oxidation layer of the polymer surface and the polymer inside. In addition, detection of oxygen content according to distance from the surface to the inside showed that the oxide film was rapidly formed on the surface, while detection of oxygen in a similar weight to that of the beginning stage inside of the polymer showed internal oxidation did not occur.

Based on the optical microscopy analysis and the component analysis using scanning electron microscopy/energy dispersive X-ray analysis in Example, oxidation rapidly occurred from the surface to form a clear oxide film when the resin composition was exposed to high temperatures for a long time, and the oxide film functions to prevent oxidation of the inside of the polymer.

Figure 4:
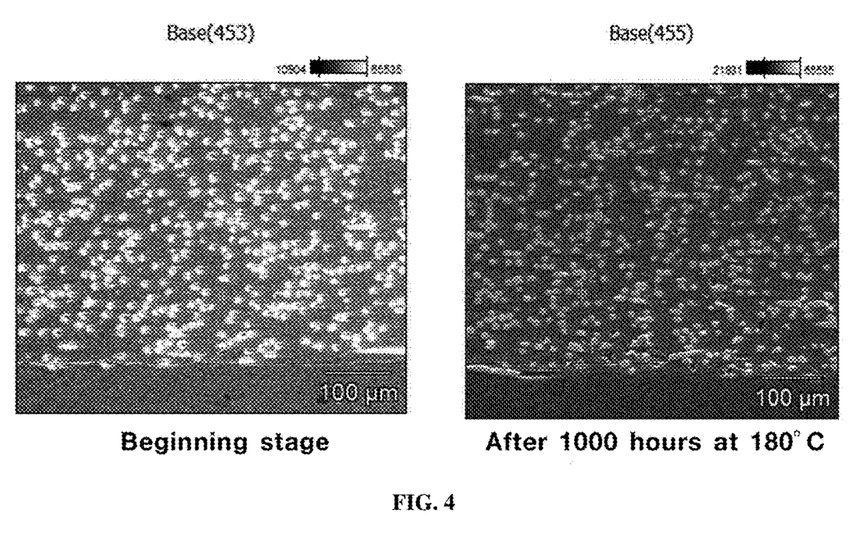
FIG. 4 is a scanning electron microscope (SEM) image showing cross-section analysis of a polymer of a substrate coated with a polyamide resin composition as prepared in Comparative Example as compared to an exemplary embodiment of the present invention.

FIG. 4 is a scanning electron microscope (SEM) image showing cross-section analysis of the polymer of the substrate coated with the polyamide resin composition prepared in Comparative Example. As shown in FIG. 4, after the resin composition was exposed in the chamber at 180° C. for 1,000 hours, measurement points were plotted in a depth direction to measure oxygen content, as compared to the beginning stage. Further, as shown in FIG. 6, after the resin composition was exposed in the chamber at 180° C. for 1,000 hours, oxidation depth greatly increased from the surface, as compared to the beginning stage and oxidation continued as the depth increased.

Figure 5:
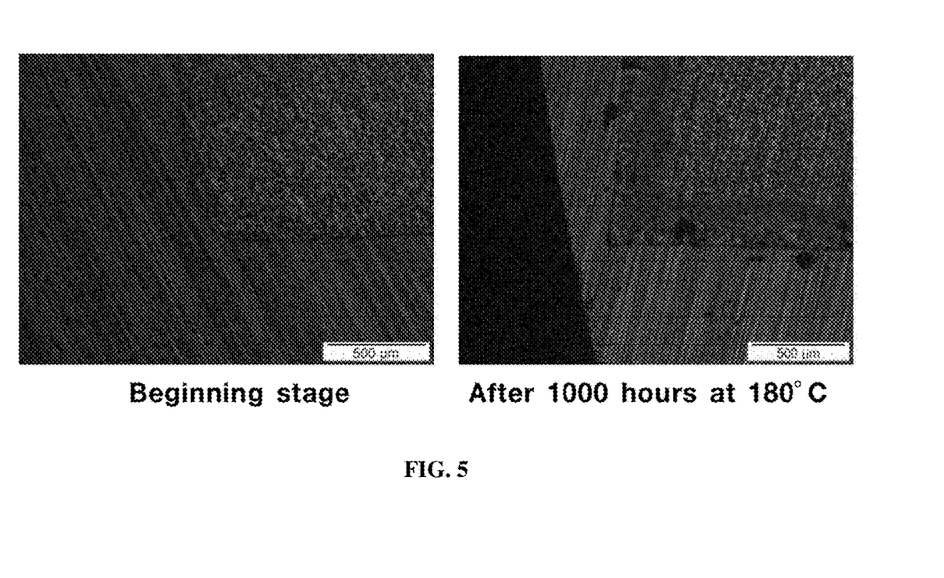
FIG. 5 is an optical microscope (OM) image showing cross-section analysis of a polymer of a substrate coated with a polyamide resin composition as prepared in Comparative Example as compared to an exemplary embodiment of the present invention.

FIG. 5 is an optical microscope (OM) image showing cross-section analysis of the polymer of the substrate coated with the polyamide resin composition prepared in Comparative Example. As shown FIG. 5, after the resin composition was exposed in the chamber at 180° C. for 1,000 hours, severe oxidation occurred down to a point of about 268 μm from the polymer surface, as compared to the beginning stage. Unclear boundary between the oxidation part and the polymer surface showed that an oxide film was not formed, and high oxygen weight parts even at a depth of 268 μm or more showed oxidation further proceeded to the inside of the polymer.

Based on the optical microscopy analysis and the component analysis using scanning electron microscopy/energy dispersive X-ray analysis, in Comparative Example, oxidation occurred from the surface to the inside when the resin composition standing at a high temperature for a long time. It was confirmed that such oxidation was the cause of deterioration in physical properties of the polymer by degradation at high temperature.

FIG. 6 is a graph showing oxygen content variation according to the depth from the polymer surface before and after high-temperature heating with respect to substrates coated with the polyamide resin compositions prepared in Example and Comparative Example. Similar to FIGS. 2 and 4, FIG. 6 shows comparison results of oxygen contents according to the depth from the surface to the inside, measured by energy dispersive X-ray analysis (EDX), with respect to the substrates coated with the polyamide resin compositions, before (in the beginning stage) and after the resin compositions were exposed in the chamber at 180° C. for 1,000 hours. Partiuclalry, oxygen contents at points spaced from the polymer surface by a regular distance were measured by energy dispersive X-ray analysis (EDX). Component analysis results of oxygen content according to depth are shown in the following Table 1 and FIG. 6.

TABLE 1

| Items | Oxygen content (% by weight) | | | | |
|---|---|---|---|---|---|
| | 0 μm | 100 μm | 200 μm | 300 μm | 400 μm |
| Example (Beginning stage) | 27.24 | 27.03 | 27.22 | 26.97 | 27.1 |
| Example (1,000 hours aging) | 31.04 | 27.13 | 27.32 | 27.46 | 27.31 |
| Comparative Example (Beginning stage) | 27.76 | 26.62 | 27.02 | 27.4 | 27.77 |
| Comparative Example (1,000 hours aging) | 29.3 | 29.46 | 28.65 | 28.8 | 28.73 |

As apparent from results shown in Table 1 and FIG. 6, in Comparative Example, after the resin composition was exposed at 180° C. for 1,000 hours, oxygen content increased by 3% by weight, as compared to the beginning stage and the content of detected oxygen similarly increased, independent of the depth. This means that oxidation occurred from the polymer surface to the inside. On the other hand, in Example, after the resin composition was exposed at 180° C. for 1,000 hours, oxygen content increased by 4% by weight within a depth of 100 μm from the polymer surface, as compared to the beginning stage, but there was almost no variation at depths of 100 μm or more. As results, when oxidation rapidly occurred on the surface in Example, oxidation did not proceed inside the polymer any more.

Test Example 2

Comparison of Physical Properties such as Impact Strength, Tensile Strength, Elongation and Flexural Strength Between Polyamide Resin Compositions Battery fuse terminals (BFTs) included in engine rooms for vehicles were produced using the polyamide resin compositions prepared in Example and Comparative Example, and performance thereof were compared and evaluated. First, the battery fuse terminals produced in Example and Comparative Example were allowed to stand at 180° C. for 1,000 hours and then allowed to stand at room temperature for 24 hours to completely cool the same. Then, a steel ball with a weight of 22 g was free dropped from a height of 1 m on the ground of each of the battery fuse terminals produced in Example and Comparative Example, and whether or not they had been broken was observed. The results are shown in the following Tables 2 and 3 and FIGS. 7 to 11.

Measurement Method (1) Impact Strength

According to the present invention, an oxide film may be formed on the surface of Example under harsh high-temperature conditions, therefore, may prevent oxidation from proceeding to the inside. In the test examples, measurement was performed by a test method in accordance with ASTM D 256. To prove this fact, impact strength of the plastic according to thermal aging time was evaluated. Materials of Example and Comparative Example were placed in the 180° C. chamber and impact strength over time was measured.

(2) Tensile Strength

Figure 7:
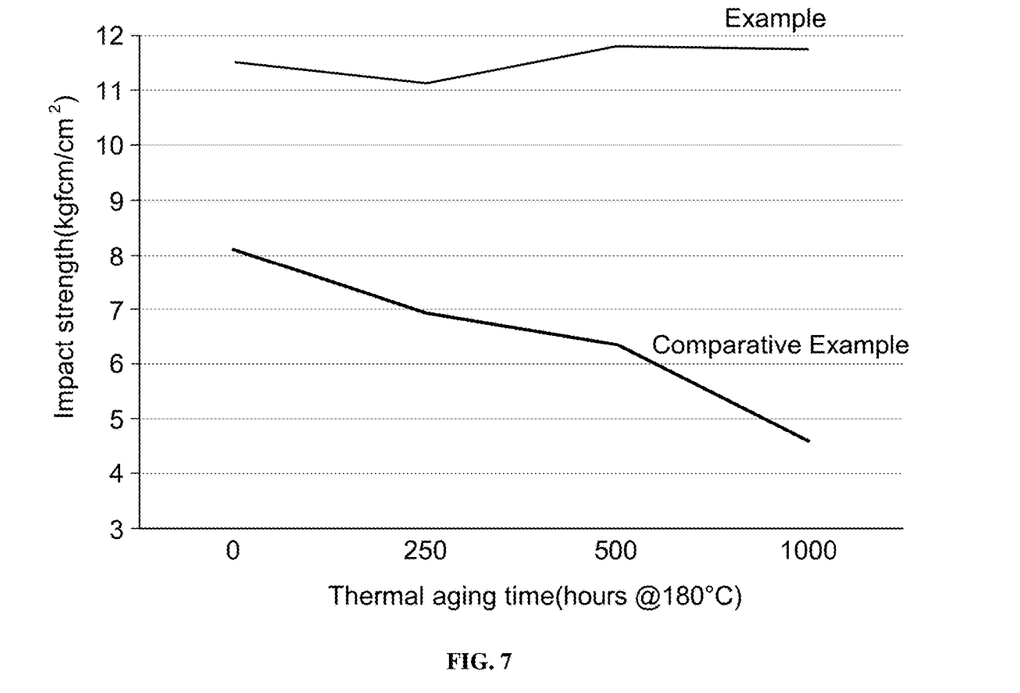
FIG. 7 is a graph showing impact strength variation with thermal aging time, with respect to substrates coated with polyamide resin compositions as prepared in Example according to an exemplary embodiment of the present invention and in Comparative Example.

Materials of Example and Comparative Example were placed in the 180° C. chamber and tensile strength over time was measured. The measurement was performed by a test method in accordance with ASTM D 638. (3) Elongation Materials of Examples and Comparative Example were placed in the 180° C. chamber and elongation over time was measured. The measurement was performed by a test method in accordance with ASTM D 638. (4) Flexural Strength Materials of Example and Comparative Example were placed in the 180° C. chamber and flexural strength with time was measured. The measurement was performed by a test method in accordance with ASTM D 790.

with the polyamide resin compositions prepared in Example and Comparative Example. As shown in FIG. 7, Comparative Example has significantly reduced impact strength over time, in particular, physical properties were significantly reduced after 500 hours. This deterioration in physical properties was caused by thermal decomposition of the polymer by oxidation under high temperature conditions, as shown in FIG. 5.

On the other hand, Example had slightly decreased physical properties were slightly within 250 hours, strength was rather increased after that time, and strength was maintained after 500 hours. This means that thermal decomposition by oxidation begun within 250 hours for which an oxide film was rapidly formed in the beginning stage, and deterioration in physical properties by thermal decomposition did not occur after the formed oxide film prevented permeation of exterior oxygen. The reason for this is that polymer chains were rearranged at a glass transition temperature or greater in parts where physical properties might be slightly improved. In addition, in Comparative Example, physical properties were significantly reduced without improvement in physical properties because polymer chains were decomposed by oxidation before the polymer chains were rearranged at a glass transition temperature or higher.

TABLE 2

| | Items | | | | | | | |
|---|---|---|---|---|---|---|---|---|
| | Comparative Example | | | | Example | | | |
| Materials | | | | | | | | |
| | PA6T/PA66 + GF | | | | PA6T/PA66 + GF + Citric acid + EDTA | | | |
| Test conditions | | | | | | | | |
| | Beginning stage | 160° C., 1,000 hr | 180° C., 1,000 hr | 200° C., 1,000 hr | Beginning stage | 160° C., 1,000 hr | 180° C., 1,000 hr | 200° C., 1,000 hr |
| Impact strength | 8.1 | 7.1 | 4.6 | 3.2 | 11.5 | 11.1 | 11.7 | 11.3 |
| Tensile strength | 201 | 172 | 159 | 97 | 205 | 201 | 200 | 195 |
| Flexural strength | 258 | 205 | 182 | 136 | 255 | 244 | 240 | 246 |
| Elongation (%) | 3 | 2.7 | 2.25 | 1.8 | 3.1 | 3 | 3 | 3.1 |
| Steel ball drop test (1 m height, 22 g steel ball) | Not broken | Broken | Broken | Broken | Not broken | Not broken | Not broken | Not broken |

As shown from the results of Table 2, in case of Comparative Example, all physical properties of impact strength, tensile strength, flexural strength and elongation were significantly degraded at the testing temperature of 160° C. 180° C. and 200° C. under the time condition of 1,000 hours and deterioration occurred at 40% at maximum. On the other hand, in case of Example, all physical properties of impact strength, tensile strength, flexural strength and elongation were significantly maintained within 5% at the testing temperature of 160° C. 180° C. and 200° C. under the time condition of 1,000 hours. When a steel ball with a weight of 22 g was free dropped from a height of 1 m, all the components produced using the composition of Comparative Example were broken, while those of Example were not broken. This proved that the polyamide resin composition of Example formed an oxide film at the high temperature for a long time, thereby avoiding deterioration of durability by oxidation and degradation despite exposure to high temperatures for a long time.

Figure 8:
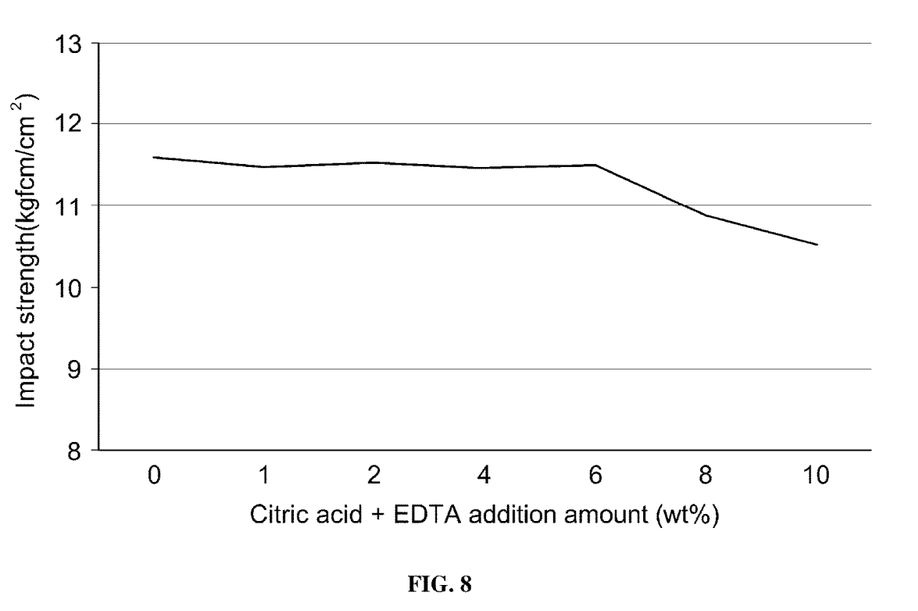
FIG. 8 is a graph showing impact strength variation according to additive (citric acid/ EDTA) content, with respect to an exemplary substrate coated with an exemplary polyamide resin composition as prepared in Example according to an exemplary embodiment of the present invention.

FIG. 7 is a graph showing impact strength variation with thermal aging time, with respect to the substrates coated FIG. 8 is a graph showing impact strength variation according to additive (mixture of citric acid and EDTA in a weight ratio of 1:1) content with respect to the substrate coated with the polyamide resin composition prepared in Example.

TABLE 3

| | Items (% by weight) | | | | | | |
|---|---|---|---|---|---|---|---|
| | 0 | 1 | 2 | 4 | 6 | 8 | 10 |
| Impact strength (kgfcm/cm$^2$) | 11.6 | 11.48 | 11.53 | 11.48 | 11.5 | 10.89 | 10.53 |

As shown from the results in Table 3 and FIG. 8, amounts of added citric acid (3% by weight) and EDTA (3% by weight) were gradually decreased from 6% by weight or greater. This proved that addition of the acid-based substances affected decomposition, resulting in deterioration of physical properties. In addition, when citric acid and EDTA are absent (0), strength was not reduced, but there were problems associated with gases generated during injection molding. On the other hand, when contents of citric acid and EDTA were 1 to 4% by weight, initial strength was maintained and long-term physical property maintenance was excellent. When the optimum total weight of the acidic additive was 2% by weight including 1% by weight of citric acid and 1% by weight of EDTA, long-term physical property maintenance was the best.

Figure 9:
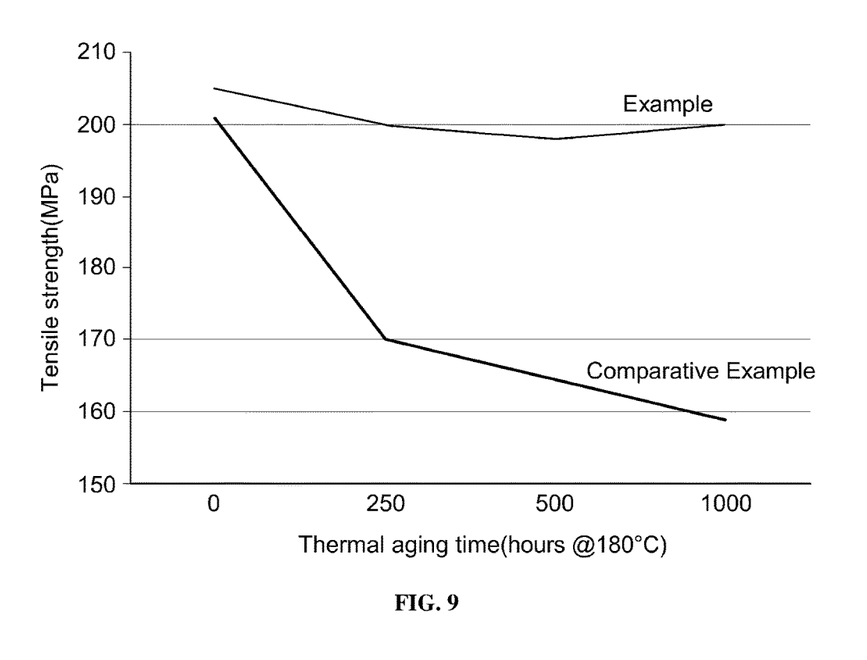
FIG. 9 is a graph showing tensile strength variation with thermal aging time, with respect to substrates coated with polyamide resin compositions as prepared in Example according to an exemplary embodiment of the present invention and in Comparative Example.

FIG. 9 is a graph showing tensile strength variation with thermal aging time, with respect to the substrates coated with the polyamide resin compositions prepared in Example and Comparative Example. As shown in FIG. 9, in Comparative Example, tensile strength was reduced over time, in particular, physical properties were significantly reduced within 250 hours. This deterioration in physical properties was caused by thermal decomposition of the polymer by oxidation under high temperature conditions, as can be seen from FIG. 5. On the other hand, it was seen in Example that physical properties were slightly decreased within 500 hours, strength was then rather increased, and strength was maintained for 1,000 hours. This showed that the strength variation is similar to impact strength variation, which resulted from oxidation blocking effect. In other words, this means that thermal decomposition by oxidation began within 250 hours for which an oxide film was formed in the beginning stage, and deterioration in physical properties by thermal decomposition did not occur after the formed oxide film prevented permeation of exterior oxygen.

Figure 10:
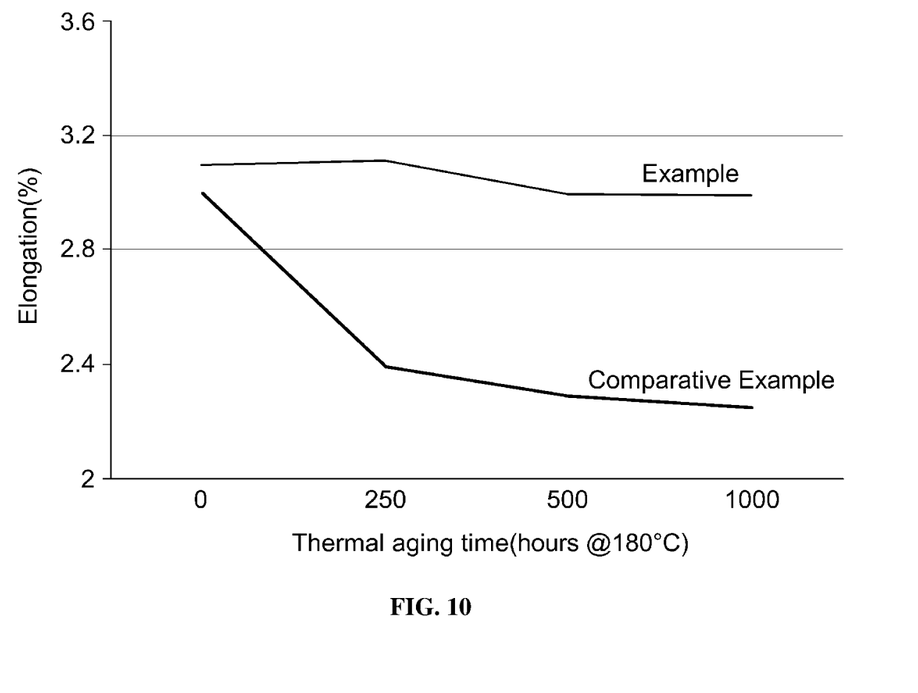
FIG. 10 is a graph showing elongation variation with thermal aging time, with respect to substrates coated with polyamide resin compositions as prepared in Example according to an exemplary embodiment of the present invention and in Comparative Example.

FIG. 10 is a graph showing elongation variation with thermal aging time, with respect to the substrates coated with the polyamide resin compositions prepared in Example and Comparative Example. As shown in FIG. 10, in Comparative Example, elongation was reduced over time, in particular, physical properties were significantly reduced within 250 hours. This deterioration in physical properties was caused by thermal decomposition of the polymer by oxidation under high temperature conditions, as can be seen from FIG. 5. On the other hand, in Example, physical properties were slowly decreased within 500 hours and then were maintained for 1,000 hours. There was almost no variation in elongation due to oxidation blocking effect. This means that the polymer materials had high dimensional strength at high temperatures for a long time.

Figure 11:
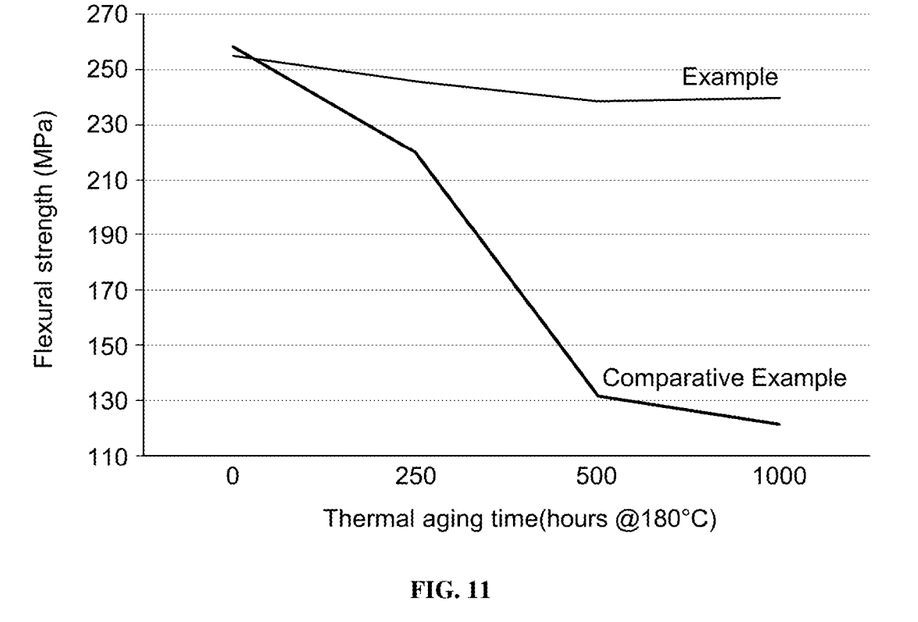
FIG. 11 is a graph showing flexural strength variation with thermal aging time, with respect to substrates coated with polyamide resin compositions as prepared in Example according to an exemplary embodiment of the present invention and in Comparative Example.

FIG. 11 is a graph showing flexural strength variation with thermal aging time, with respect to the substrates coated with the polyamide resin compositions prepared in Example and Comparative Example. As shown in FIG. 11, in Comparative Example, flexural strength was reduced over time, in particular, physical properties were significantly reduced after 250 hours. This deterioration in physical properties was caused by thermal decomposition of the polymer by oxidation under high temperature conditions, as can be seen from FIG. 5. On the other hand, in Example, physical properties were slowly decreased with time within 500 hours and were then maintained for 1,000 hours. This showed that the strength variation was similar to impact strength and tensile strength variations. Accordingly, similar physical property values were the same due to oxidation blocking effect. This means that thermal decomposition by oxidation begun within 500 hours for which an oxide film was rapidly formed in the beginning stage, and deterioration in physical properties by thermal decomposition did not occur after the formed oxide film prevented permeation of exterior oxygen.

Accordingly, since the polyamide resin composition according to the present invention is prepared by mixing a polyamide copolymer having high heat resistance and high rigidity with citric acid and ethylenediaminetetraacetic acid (EDTA) which rapidly cause surface oxidation with glass fibers, highly dense oxide film may be on the polymer surface when the polymer components are exposed to a high temperature for a long time, thereby preventing oxidation and thermal decomposition by exterior oxygen and heat.

In addition, as compared to conventional materials, the resin composition may have substantially improved physical properties such as impact strength, tensile strength, flexural strength and elongation at high temperatures for a long time, and may be used instead of expensive heat-resistant materials requiring excellent physical properties, thereby reducing production cost by 20% or greater.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A polyamide resin composition, comprising:
an amount of about 56 to 69% by weight of a polyamide copolymer represented by the following Formula 1;
an amount of about 30 to 40% by weight of a glass fiber;
an amount of about 0.5 to 2% by weight of citric acid; and
an amount of about 0.5 to 2% by weight of ethylenediaminetetraacetic acid (EDTA),
all the % by weights are based on the total weight of the polyamide resin composition, Formula I wherein n and m are same or different positive integers, wherein the PA6T is hexamethylene terephthalamide, and wherein the PA66 is hexamethylene adipamide.

2. The polyamide resin composition of claim 1, wherein the polyamide copolymer comprises the PA6T (hexamethylene terephthalamide) and the PA66 (hexamethylene adipamide) mixed in a weight ratio of about 6:4 to about 5:5.

3. The polyamide resin composition of claim 1, wherein the glass fiber has a diameter of about 10 to 13 μm and a length of about 250 to 500 μm.

4. The polyamide resin composition of claim 1, wherein the polyamide resin composition forms an oxide film at a temperature of about 150 to 220° C. after 1,000 to 1,200 hours.

5. The polyamide resin composition of claim 4, wherein the oxide film has a thickness of about 45 to 55 μm.

6. The polyamide resin composition of claim 1, consisting essentially of:
an amount of about 56 to 69% by weight of the polyamide copolymer;
an amount of about 30 to 40% by weight of the glass fiber;
an amount of about 0.5 to 2% by weight of citric acid; and an amount of about 0.5 to 2% by weight of ethylenediaminetetraacetic acid (EDTA), all the % by weights are based on the total weight of the polyamide resin composition.

7. The polyamide resin composition of claim 1, consisting of:

an amount of about 56 to 69% by weight of the polyamide copolymer;

an amount of about 30 to 40% by weight of the glass fiber;

an amount of about 0.5 to 2% by weight of citric acid; and an amount of about 0.5 to 2% by weight of ethylenediaminetetraacetic acid (EDTA), all the % by weights are based on the total weight of the polyamide resin composition.

8. An article comprising a polyamide resin composition of claim 1.

9. A vehicle part comprising a polyamide resin of claim 1.

10. The vehicle part of claim 9 is a battery fuse terminal of a vehicle.

* * * * *